(12) United States Patent
Bishop, Jr. et al.

(10) Patent No.: US 6,553,021 B1
(45) Date of Patent: Apr. 22, 2003

(54) CALL MANAGEMENT IN A TDMA SYSTEM THROUGH VARIABLE PACKET FORMATTING

(75) Inventors: James William Bishop, Jr., Chandler, AZ (US); Thomas Peter Emmons, Jr., Mesa, AZ (US); Robert Anthony Peters, Silver Spring, MD (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/437,672

(22) Filed: Nov. 10, 1999

(51) Int. Cl.[7] ............................................. H04B 7/212
(52) U.S. Cl. ..................... 370/347; 370/316; 370/528; 455/450
(58) Field of Search ................................. 370/347, 332, 370/335, 337, 349, 252, 468, 454, 443, 336, 316, 328; 455/436, 450, 452, 454, 406, 408

(56) References Cited

U.S. PATENT DOCUMENTS

| | | | | |
|---|---|---|---|---|
| 3,825,899 A | | 7/1974 | Haeberle et al. ......... 340/172.5 |
| 4,135,059 A | | 1/1979 | Schmidt ..................... 179/15 |
| 5,594,738 A | * | 1/1997 | Crisler et al. ............... 370/347 |
| 5,724,659 A | * | 3/1998 | Daniel et al. ............... 455/452 |
| 5,886,984 A | * | 3/1999 | Abu-Amara et al. ........ 370/252 |
| 6,026,082 A | * | 2/2000 | Astrin ........................ 370/336 |
| 6,078,577 A | * | 6/2000 | Bishop, Jr. et al. ......... 370/348 |
| 6,154,643 A | * | 11/2000 | Cox ............................ 455/406 |
| 6,301,232 B1 | * | 10/2001 | Dutta ......................... 370/321 |
| 6,393,000 B1 | * | 5/2002 | Feldman ..................... 370/316 |
| 6,400,723 B1 | * | 6/2002 | Burg et al. .................. 370/412 |
| 6,407,993 B1 | * | 6/2002 | Moulsley .................... 370/347 |

* cited by examiner

Primary Examiner—Nay Maung
Assistant Examiner—Joy K. Contee
(74) Attorney, Agent, or Firm—Frank J. Bogacz

(57) ABSTRACT

A time division multiple access (TDMA) communications system (20) includes a first TDMA platform (22) for transmitting a call (32) over a circuit switched communication link (36) to a second TDMA platform (24). The call (32) exhibits a first signal type (84) and second signal type (86). A controller (42) establishes a capacity allocation (200) responsive to the first signal type (84) for the communication link (36). When the call (32) exhibits the first signal type (84), the first TDMA platform (22) transmits first packets (111) of the call (32) in a first packet format (113) using the capacity allocation (200), and when the call (32) exhibits the second signal type (86), the first TDMA platform (22) transmits second packets (140) of the call (32) in a second packet format (139) using the capacity allocation (200).

18 Claims, 8 Drawing Sheets

CALL MANAGEMENT IN A TDMA SYSTEM THROUGH VARIABLE PACKET FORMATTING

TECHNICAL FIELD OF THE INVENTION

The present invention relates to the field of time division multiple access (TDMA) and frequency division multiple access (FDMA) communications systems. More specifically, the present invention relates to methods and systems that improve the efficiency of transmitting packets of variable sizes through the use of new packet formatting techniques that reduce the overhead required for high data rate transmission.

BACKGROUND OF THE INVENTION

Terrestrial-based and satellite-based radio communications systems are becoming more prevalent for providing radio communication services on both voice and data throughout the world. As such systems acquire more subscribers, the demands on the finite frequency bandwidth allocated to these wireless communication system increases. In addition, ever increasing data rates of the communications signals between transmitting and receiving units further increase the demand for this finite frequency bandwidth.

Radio communications systems often employ frequency division multiple access (FDMA) techniques for separating multiple transmissions over a finite frequency bandwidth. FDMA refers to the method of allocating different discrete frequency bands, or frequency channels, within the finite frequency bandwidth to different users to permit many concurrent conversations.

Radio communications systems also employ time division multiple access (TDMA) techniques for separating multiple transmissions. With TDMA, each subscriber is typically assigned a specific time slot or group of time slots in a TDMA frame. The subscriber transmits user-provided information only during each assigned time slot.

Yet another technique for separating multiple transmissions that may be employed by radio communications systems is code division multiple access (CDMA). CDMA is a spread spectrum technology that assigns a code to all speech bits, sends a scrambled transmission of the encoded speech over the air and recovers the original information FDMA, TDMA, and CDMA may be used alone or in combination.

For radio frequency (RF) TDMA communications, a time slot is often used to transmit a packet of data. Each packet includes overhead information and payload. The overhead information includes, for example, synchronizing bits, address of the destination, address of the originating device, length of packet, and so forth. The payload is user-provided data which is the object of the communications system. The payload is reassembled in response to the overhead information by the receiving equipment into the original signal. Through the use of TDMA, multiple conversations from separate subscribers can be interwoven into the TDMA frame.

There is a growing requirement to transmit data and voice on the same hardware, such as to be able to connect a cellular phone to a modem for wireless computer communications. Computer communications require a much higher data rate than voice communications. This extra data requirement has been met by providing more packets to the user. The problem with this approach is that packets optimized for low data rates such as for voice have an overhead information structure that utilizes approximately twenty-five percent of capacity of the packet in each time slot with the payload utilizing the remaining portion of the time slot. This high overhead limits is not required for high capacity links and limits the amount of data that may be carried in each time slot. This limitation reduces the efficiency of the communication link when transmitting high rate data signals.

Those skilled in the art will realize that there are many applications that require high data rates in addition to computer communications. These include video conferencing, video transmission (movies), and hi-fidelity Reallocation of capacity may be accomplished through the termination of the original communication link and the establishment of a new communication link, reallocation undesirably interferes with the voice conversation on the original circuit switched communication link. In addition to the inconvenience to the user, this reallocation activity is a highly time and resource consuming operation.

Accordingly, there is a significant need for a system and a method that can reduce the overhead for high speed data transmission and mitigate the problems associated with managing calls employing voice signals and data signals. This system should use the same hardware for both data and voice so the type of data is transparent to the user. In addition, there is a significant need for a system and a method that dynamically vary the transmission rate without the need for employing a reallocation activity.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
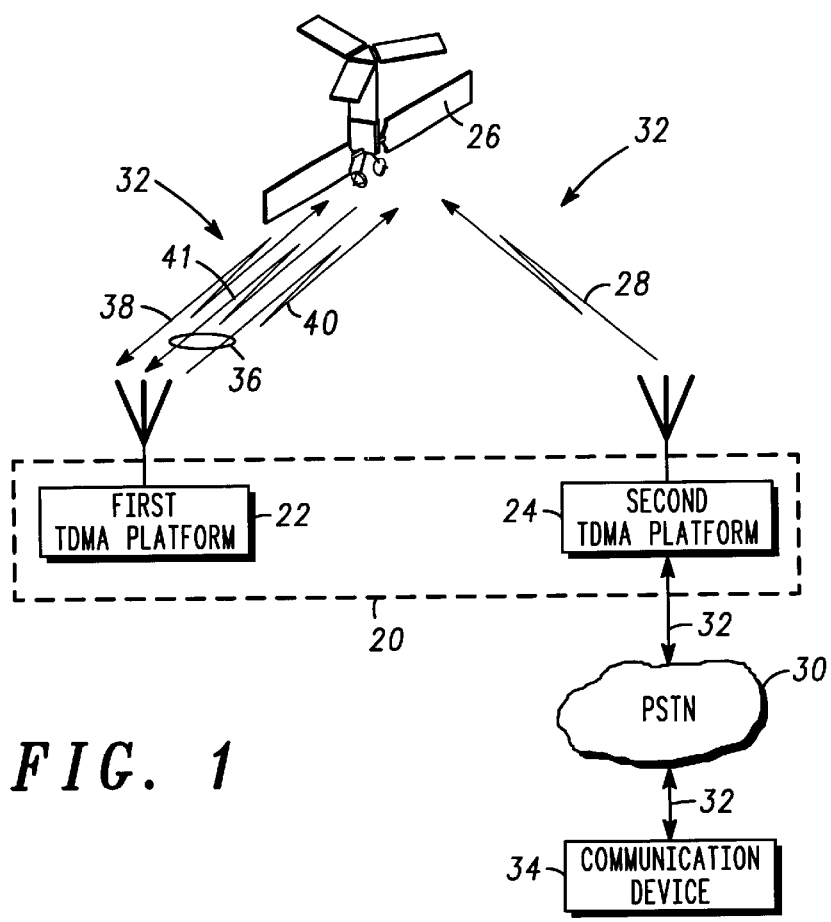
FIG. 1 shows a simplified block diagram of a time division multiple access (TDMA) communications system in accordance with a preferred embodiment of the present invention.

FIG. 1 shows a simplified block diagram of a time division multiple access (TDMA) communications system 20 in accordance with a preferred embodiment of the present invention. TDMA communications system 20 includes a first TDMA platform 22 and a second TDMA platform 24. Second TDMA platform 24 is a communications satellite in communication with a gateway 26 via a feeder link 28.

In the exemplary configuration of FIG. 1, gateway 26 includes the hardware and software that effects an interconnection between TDMA communications system 20 and another communications network such as a public switched telephone network (PSTN) 30 in order to conduct a call 32 between first TDMA platform 22 and a communication device 34 coupled to PSTN 30. Thus, second TDMA platform 24, gateway 26, and PSTN 30 serve as nodes, or points of connection, between first TDMA platform 22 and communication device 34 for the transmission of call 32.

Call 32 is an association between first TDMA platform 22 and communication device 34 that is established by the use of network capabilities of TDMA communications system 20 and PSTN 30 for the purpose of exchanging information. Call 32 may exhibit two differing signal types, for example, real time signals and data signals (discussed below). TDMA communications system 20 is configured to manage the transmission of call 32 between first and second TDMA platforms 22 and 24, respectively, so as to desirably optimize the spectral efficiency or the effectiveness with which TDMA system 20 uses its assigned radio spectrum.

First TDMA platform 22 is a transmitter/receiver subscriber unit for conducting radio communications with other transmitter/receiver subscriber units, with communications satellites, with nodes connected to the PSTN, and so forth. First TDMA platform 22 may be a hand-held subscriber unit, a two-way paging system, a computer system with transmit/receive capabilities, and so forth. TDMA communications system 20 is shown with a single first TDMA platform 22 for simplicity of illustration. However, it should be readily apparent to those skilled in the art that communications system 20 can accommodate a number of TDMA platforms.

The second TDMA platform 24 can be a Non-Geosynchronous (Non-Geo) communications satellite, such as a Low Earth Orbit (LEO) satellite, a Geosynchronous (GEO) satellite, a terrestrial base station, and the like. TDMA communications system 20 is shown with a single satellite 24 having a single coverage area for simplicity of illustration. It should be readily apparent to those skilled in the art that TDMA communications system 20 can include many more satellites, terrestrial base stations, or a combination of both satellites and base stations for providing world-wide or near world-wide radio communication services.

In addition, call 32 is shown as being routed over feeder link 28, through gateway 26, and over PSTN 30, to communication device 34 for simplicity of illustration. It should be readily apparent to those skilled in the art that call 32 may be routed through another satellite or terrestrial base station over a radio frequency communication link (not shown). In addition call 32 may be routed to another hand-held subscriber unit or units, a two-way paging system, a computer system with transmit/receive capabilities, or an additional communication device 34.

TDMA communications system 20 employs a circuit switching methodology. That is a connection, or a communication link, is established on demand between two or more TDMA platforms for the exclusive use by the platforms until the connection is released. In the exemplary scenario shown in system 20, a circuit switched communication link 36 forms a communication path for call 32 between first TDMA platform 22 and second TDMA platform 24 through call request and control messaging over acquisition channels 38. Acquisition channels 38 are broadcast by second TDMA platform 24 and are monitored by the TDMA platforms, for example, first TDMA platform 22, within the coverage area for second TDMA platform 24.

Through messaging over acquisition channels 38, communication link 36 is established between first TDMA platform 22 and second TDMA platform 24. Circuit switched communication link 36 is exclusively used for the transmission of call 32 between first TDMA platform 22 and second TDMA platform 24 after access has been obtained or a hand-off is made.

Traffic channels are channels that are assigned to particular TDMA platforms by communications system 20 during certain TDMA frames. A traffic channel assigned to a particular TDMA platform is a particular time slot or group of time slots in a TDMA frame on a particular frequency channel or set of frequency channels. In the preferred embodiment, communication link 36 includes an uplink channel 40 and a downlink channel 41. The particular frequency bands and/or time slots allocated for uplink channel 40 and downlink channel 41 desirably differ from each other so as to prevent interference.

Figure 2:
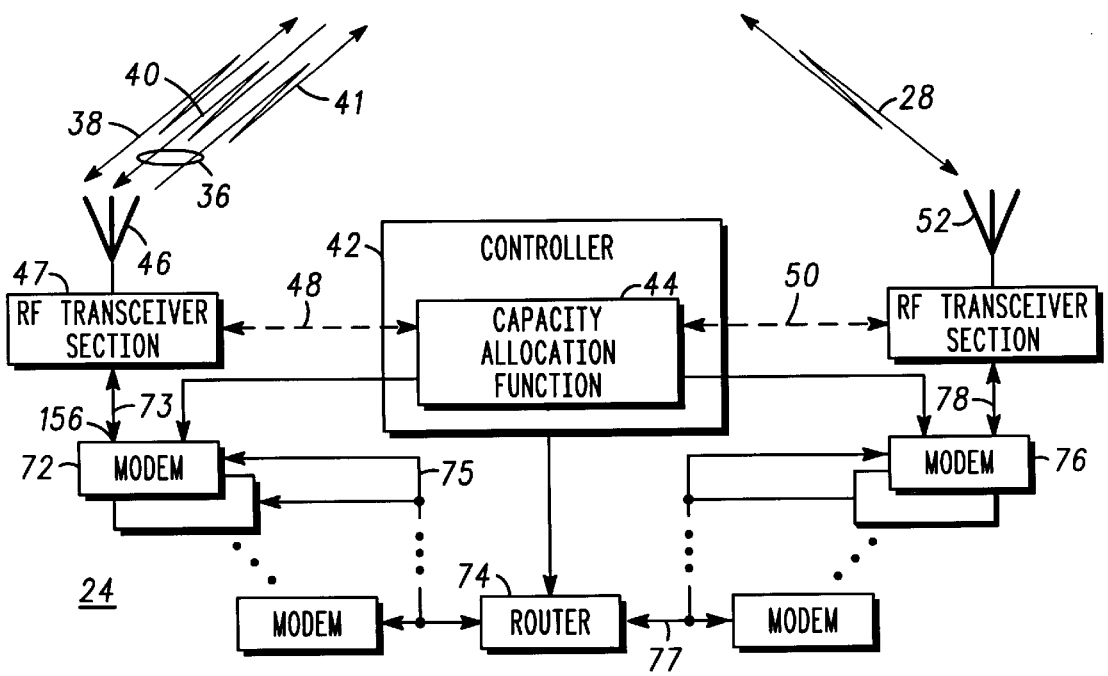
FIG. 2 shows a simplified block diagram of a second TDMA platform in the TDMA communications system in accordance with a preferred embodiment of the present invention.

FIG. 2 shows a simplified block diagram of second TDMA platform 24 in TDMA communications system 20 in accordance with a preferred embodiment of the present invention. Second TDMA platform 24 includes a controller 42 having among other things a capacity allocation function 44 for allocating frequency channels and assigning time slots for circuit switched communication link 36.

Controller 42 receives and processes call requests from subscriber units, such as first TDMA platform 22, over acquisition channels 38 received at a first antenna element 46 and subsequently processed at a first RF transceiver section 47 in communication with first antenna element 46. These call requests, represented by a first dashed bidirectional arrow 48, are allocated capacity, i.e. frequency channels and time slots by capacity allocation function 44. The allocated capacity is subsequently communicated from first RF transceiver section 47 via antenna element 46 over acquisition channels 38 back to the originating TDMA platform.

In order to complete the communication path for call 32 (FIG. 1), controller 42 may also allocate capacity on feeder link 28 for the transmission of call 32 over feeder link 28 to gateway 26 (FIG. 1), as represented by a second dashed bidirectional arrow 50. The allocation of capacity for the transmission of call 32 over feeder link 28 may be performed according to conventional gateway protocols compatible with gateway 26 and will not be described herein. The allocated capacity may be subsequently communicated from a second RF transceiver section 51 via a second antenna element 52 to gateway 26.

Figure 3:
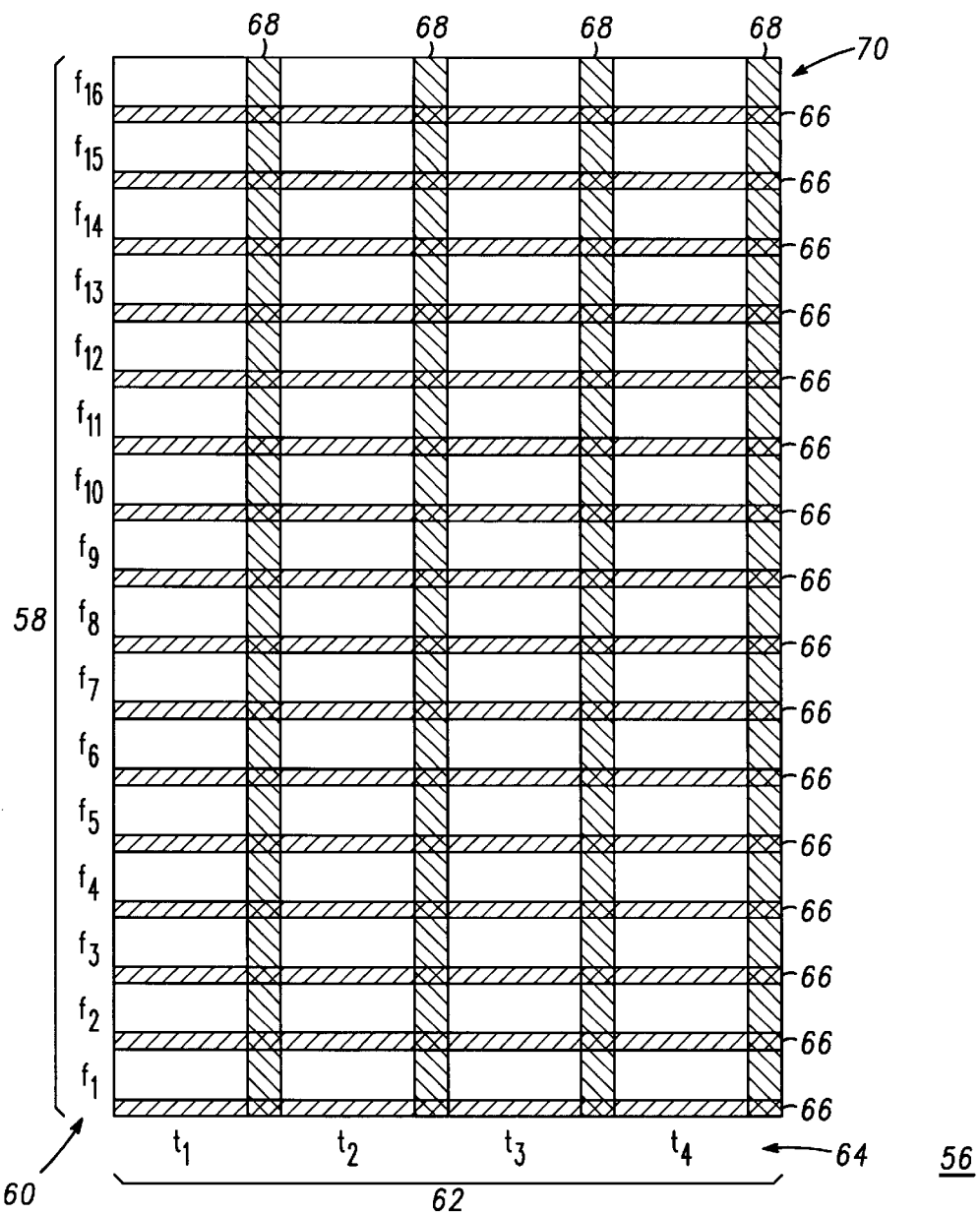
FIG. 3 shows a diagram of a capacity allocation map maintained by a capacity allocation function of the communications map.

FIG. 3 shows a diagram of a capacity allocation map 56 maintained by capacity allocation function 44. Capacity allocation map 56 shows a finite frequency bandwidth 58 separated into a plurality of frequency channels 60 that may be assigned for communication between first and second TDMA platforms 22 and 24 (FIG. 1) in accordance with FDMA methodologies. In addition, capacity allocation map 56, shows a TDMA frame 62 subdivided into adjacent time slots 64 in accordance with TDMA methodologies. Likewise, time slots 64 are aligned with, or adjacent to, corresponding time slots 64 in adjacent frequency channels 60.

Map 56 further shows frequency channels 60 separated by frequency guard bands 66 and time slots 64 separated by time guard bands 68. Frequency guard bands 66 are unutilized, narrow frequency bands between adjacent frequency channels 60 which serve to reduce interference, such as crosstalk, between the adjacent frequency channels 60. Likewise, time guard bands 68 are time intervals between adjacent time slots 64 that are left vacant to provide a margin of safety against interference in the time domain between sequential transmissions.

The combination of frequency channels 60 and time slots 64 form a radio spectrum 70 for use by controller 42 (FIG. 2) of second TDMA platform 24 (FIG. 2) in establishing communication links, such as circuit switched communication link 36 (FIG. 1). Capacity allocation function 44 (FIG. 2) of controller 42 assigns a portion of radio spectrum 70 in accordance with map 56 to desirably optimize the use of frequency channels 60 and time slots 64 for the transmission of calls exhibiting multiple signal types, such as voice and data, in a circuit switched connection without employing channel reallocation techniques. This capacity assignment will be discussed in greater detail below.

Referring back to FIG. 2, once capacity is assigned through capacity allocation function 44 and circuit switched communication link 36 established, second TDMA platform 24 serves as a switching node in TDMA communications system 20. Accordingly, first RF transceiver section 47 is coupled to modems 72 through bidirectional links 73. Likewise, modems 72 are coupled to a router 74 via bidirectional links 75. Similarly, router 74 is coupled to modems 76 through bidirectional links 77, and modems 76 are in communication with second RF transceiver section 51 through bidirectional links 78.

Modems 72 include transmission and receiving sections that will be described in further detail in connection with FIGS. 5–6 below. Modems 76 may be functionally equivalent to modems 72, although that is not a limitation of the present invention. Rather, modems 76 may be configured to be compatible with the gateway protocols employed for the transmission of call 32 over feeder link 28 (FIG. 1), or any of a number of transmission protocols provided for communications between dissimilar routers.

Router 74 is used as an interface for communications between subscriber units, such as first TDMA platform 22, and other nodes, such as gateway 26, other satellites, and the like. Router 74 contains intelligence that allows router 74 to select one of the several paths that network call traffic may follow. Modems 72, router 74, and modems 76 are responsive to controller 42 for the appropriate switching of call 32 between communication link 36 and feeder link 28.

Figure 4:
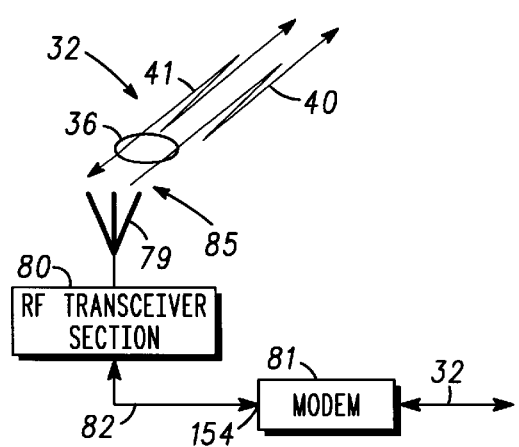
FIG. 4 shows a simplified block diagram of a first TDMA platform in accordance with the preferred embodiment of the present invention.

FIG. 4 shows a simplified block diagram of first TDMA platform 22 in TDMA communications system 20 in accordance with a preferred embodiment of the present invention. First TDMA platform 24 includes among other things, an antenna element 79 and an RF transceiver section 80 in communication with antenna element 79. A modem 81 is in communication with RF transceiver section 80 through a bidirectional link 82.

Modem 81 includes transmission and receiving sections, discussed in connection with FIGS. 5–6, that are functionally compatible with the transmission and receiving sections in modems 72 (FIG. 2) of second TDMA platform 24 so that call 32 can be effectively communicated between first and second TDMA platforms 22 and 24 over circuit switched communication link 36.

Figure 5:
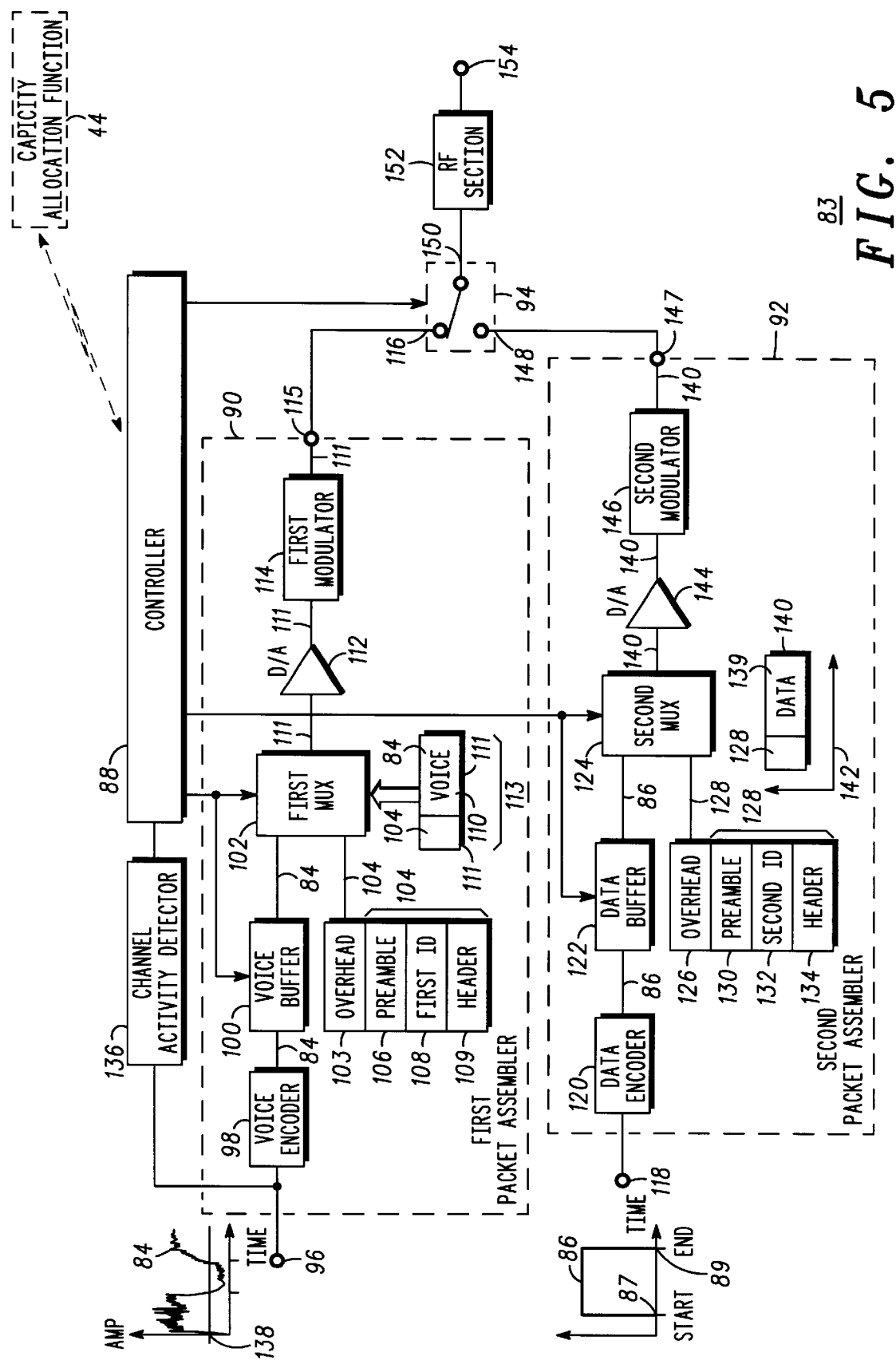
FIG. 5 shows a simplified block diagram of a transmission section of a modem for transmitting a call in accordance with the preferred embodiment of the present invention.

FIG. 5 shows a simplified block diagram of a transmission section 83, or modulator section, that is included in modems 72 (FIG. 2) of second TDMA platform 24 and modem 81 (FIG. 4) of first TDMA platform 22 for transmitting call 32. For example, transmission section 83 is employed in modem 81 when first TDMA platform 22 is transmitting a first direction 85 (FIG. 4) of call 32 over uplink channel 40. Transmission section 83 will be described in connection with the transmission of first direction 85 of call 32 from first TDMA platform 22 to second TDMA platform 24. However, it should be readily apparent that transmission section 83 is employed in one of modems 72 when second TDMA platform 24 transmits a second direction of call 32 to first TDMA platform 22 over downlink channel 41.

Call 32 exhibits a real time signal 84 and a data signal 86. Real time signal 84 is a signal in which there is desirably no significant perceived delay in the transmission of the signal or in the response to the signal. Accordingly, real time signal 84 may be a voice conversation, a live video signal, a live audio signal, and so forth. Data signal 86 may be a page message, a data file, and the like bounded by a start signal 87 and a stop signal 89. Network response time is not critical to data signal 86. Therefore, data signal 86 may tolerate a transmission delay. However, data signal 86 is typically less tolerant of bit errors due to transmission problems, such as noise on communication link 36.

Transmission section 83 includes a controller 88 in communication with a first packet assembler 90, a second packet assembler 92, and a switch element 94. Controller 88 manages call 32 in response to capacity allocation performed by capacity allocation function 44, as shown in ghost form. That is, first uplink channel 40 is assigned some capacity of frequency bandwidth 58 (FIG. 3) and time slots 64 (FIG. 3) according to a desired data rate for real time signal 84. Controller 88 then causes transmission section 83 to intersperse packets of data signal 86 with packets of real time signal 84 through switching at switch element 94.

First packet assembler 90 receives real time signal 84 at a first input 96. In an exemplary embodiment of the present invention, real time signal 84 is a voice signal. A voice encoder 98 is coupled to first input 96 for encoding voice signal 84 into a digital bit stream according to predetermined encoding and forward error correction protocols conventionally used for voice signal, for example, through linear predictive coding (LPC).

Encoded voice signal 84 is output from voice encoder 98 and temporarily stored in a voice buffer 100. A first multiplexer 102 of first packet assembler 90 is in communication with each of voice buffer 100 and an overhead information memory element 103 containing overhead 104. Overhead 104 includes a preamble 106 used for purposes of frame delineation and synchronization of the receiving TDMA platform, a first unique identifier 108 used to identify the signal type as being voice signal 84, and a header 109 used to indicate origination of call 32, destination of call 32, and so forth.

In response to timing and control information from controller 88, first multiplexer 102 segments encoded voice signal 84 from voice buffer 100 into first signal units 110 which are subsequently appended with overhead 104 from overhead information memory element 103 to generate first packets 111 of real time signal 84 in a first packet format 113. Thus, first packet format 113 is characterized by overhead 104 having first unique identifier 108. In addition, first packets 111 in first packet format 113 have a packet size that is substantially equivalent in duration to one of time slots 64 (FIG. 3) in TDMA frame 62 (FIG. 3).

First multiplexer 102 is in communication with an input of a digital-to-analog (D/A) converter 112. First packets 111 are input into D/A converter 112 for conversion into analog form. An output of D/A converter 112 is in communication with a first modulator 114. Following conversion to an analog signal in D/A converter 112, first packets 111 are input into first modulator 114 for subsequent modulation according to a pre-determined modulation protocol conventionally used for modulation of low data rate voice signals. Modulated first packets 111 are subsequently output by first modulator 114 at an output 115 of first packet assembler and received at a first switch input 116 of switch element 94.

Second packet assembler 92 of transmission section 83 receives data signal 86 at a second input 118. A data encoder 120 is coupled to second input 118 for encoding data signal 86 into code or symbols according to predetermined encoding and forward error correction protocols conventionally used for data signals, for example, through block or convolutional encoding.

Encoded data signal 86 is output from data encoder 120 and stored in a data buffer 122. A second multiplexer 124 of second packet assembler 92 is in communication with each of data buffer 122 and an overhead information memory element 126 containing overhead 128. Overhead 128 includes a preamble 130 used for purposes of frame delineation and synchronization of the receiving TDMA platform, a second unique identifier 132 used to identify the signal type as being data signal 86, and a header 134 used to indicate origination of call 32, destination of call 32, and so forth.

Preamble 130 may be equivalent to preamble 106. Likewise, header 134 may be equivalent to header 109. However, second unique identifier 132 differs from first unique identifier 108 so that a receiver, for example at second TDMA platform 24, can differentiate between real time signal 84 and data signal 86 (discussed below).

Transmission section 83 further includes a channel activity detector 136 in communication with first input 96 and controller 88. Channel activity detector 136 monitors first input 96 to detect silence in voice signal 84. Silence in voice signal 84 results, for example, when second TDMA platform 24 (FIG. 1) is transmitting and first TDMA platform 22 (FIG. 1) is receiving. As another example, silence in voice signal 84 occurs when the caller from first TDMA platform 22 pauses, takes a breath, thinks, and so forth.

Channel activity detector 136 detects silence in voice signal 84 by determining, for example, when a signal amplitude of voice signal 84 drops below a predetermined amplitude threshold 138. When the signal amplitude of voice signal 84 drops below predetermined threshold 138, controller 88 causes second multiplexer 124 to segment encoded data signal 86 from data buffer 122 into second signal units 139 which are subsequently appended with overhead 128 from overhead information memory element 126 to generate second packets 140 of data signal 86.

A second packet format 142 for second packets 140 is characterized by overhead 128 with second unique identifier 132. In addition, second packets 140 in second packet format 142 have a packet size that is substantially equivalent to the capacity allocation for voice signal 84. That is, each of second packets 140 is the size of one or more frequency channels 60 (FIG. 3) and one or more adjacent time slots 64 (FIG. 3), including any inside frequency guard bands 66 (FIG.3) and time guard bands 68 (FIG.3).

Second multiplexer 124 is in communication with an input of a digital-to-analog (D/A) converter 144. Second packets 140 are input into D/A converter 144 for conversion into analog form. An output of D/A converter 144 is in communication with a second modulator 146. Following conversion to an analog signal in D/A converter 144, second packets 140 are input into second modulator 146 for subsequent modulation according to a pre-determined modulation protocol conventionally used for modulation of high rate data signals. Such a modulation protocol may, for example, be quadrature amplitude modulation (QAM), quaternary phase shift keying (QPSK), and so forth. Modulated second packets 140 are subsequently output by second modulator 146 at an output 147 of second packet assembler 92 and received at a second switch input 148 of switch element 94.

Switch element 94 switches between first switch input 116 and second switch input 148 to provide either first packets 111 or second packets 140 at a switch output 150 in response to the presence or absence of voice signal 84 at first input 96 as detected by channel activity detector 136.

Switch output 150 of switch element 94 is in communication with a radio frequency (RF) amplifier element 152. RF amplifier element 152 further processes first and second packets 111 and 140, respectively, by amplifying the modulated signals. First and second packets 111 and 140 of call 32 are subsequently provided at an output 154 of transmission section 83.

In the exemplary scenario, output 154 is in communication with RF transceiver section 80 (FIG. 4) of first TDMA platform 22 via bidirectional link 82. Thus, first and second packets 111 and 140 of call 32 are processed by RF transceiver section 80 and subsequently transmitted from antenna element 79 of first TDMA platform 22 over uplink channel 40 of circuit switched communication link 36.

Figure 6:
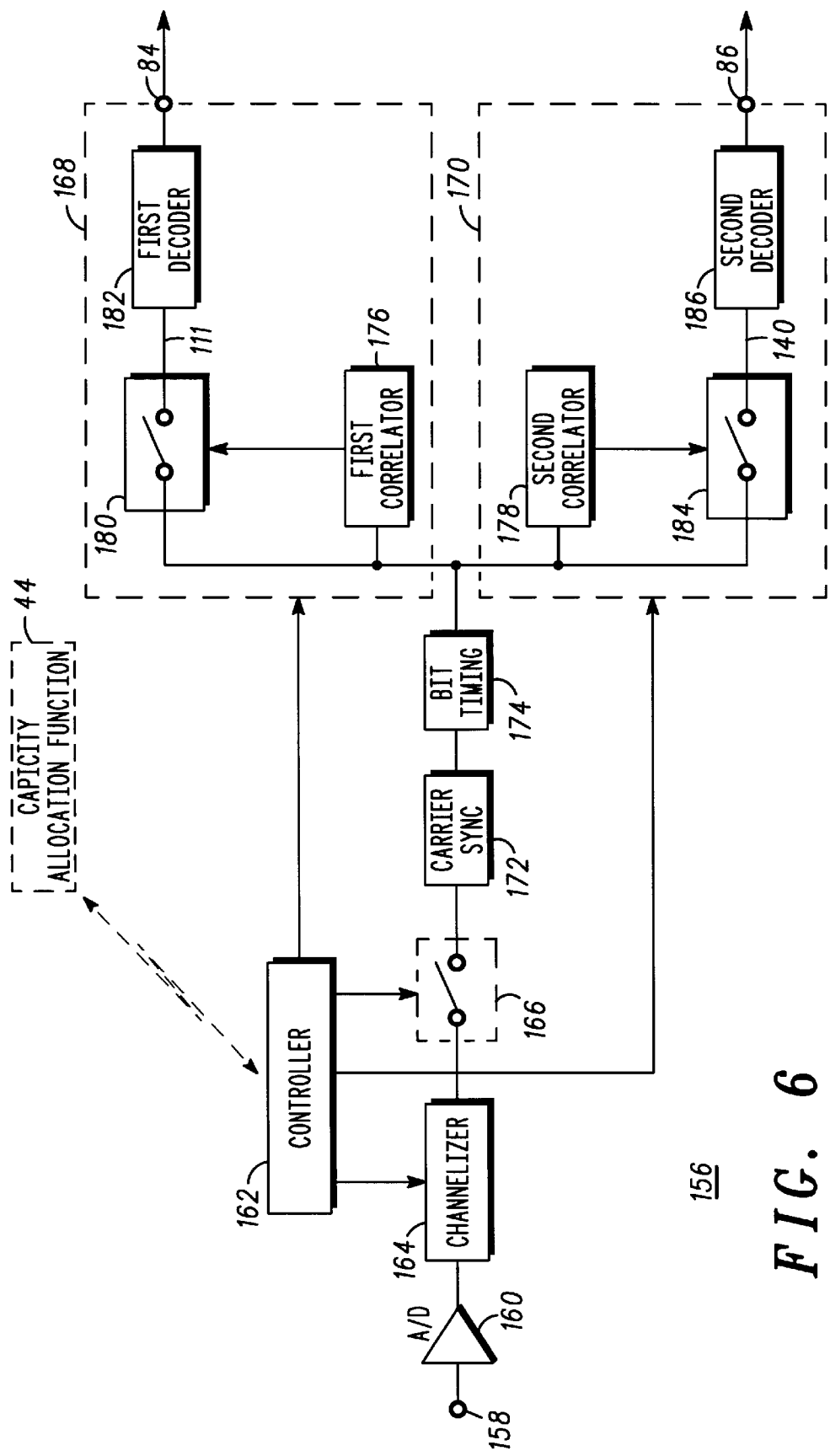
FIG. 6 shows a simplified block diagram of a receiving section of a modem for receiving the call in accordance with the preferred embodiment of the present invention.

FIG. 6 shows a simplified block diagram of a receiving section 156, or demodulator section, included in modems 72 (FIG. 2) of second TDMA platform 24 and modem 81 (FIG. 4) of first TDMA platform 22 for receiving call 32. As discussed previously, in the exemplary scenario, first TDMA platform 22 is transmitting first direction 85 of call 32 to second TDMA platform 24 over uplink channel 40. Accordingly, receiving section 156 will be described in connection with one of modems 72 in second TDMA platform 24. However, it should be readily apparent that receiving section 156 is employed in modem 81 of first TDMA platform when second TDMA platform 24 transmits a second direction of call 32 to first TDMA platform 22 over downlink channel 41.

Receiving section 156 includes an input 158. Referring momentarily to second TDMA platform 24 (FIG. 2), input 158 is in communication with RF transceiver section 47 via bidirectional links 73. First antenna element 46 of second TDMA platform 24 is configured to receive first direction 85 of call 32 having first and second packets 111 and 140. Front end processing of call 32 is performed by RF transceiver section 47 and first direction 85 of call 32 is subsequently received at input 158.

Referring back to receiving section 156 (FIG. 6), input 158 is coupled to an analog-to-digital (A/D) converter 160 for converting the frequency modulated first direction 85 of call 32 to a digital bit stream.

Receiving section 156 further includes a controller 162 responsive to capacity allocation function 44 of communications satellite 26, as shown in ghost form. Controller 162 is in communication with a channelizer 164, a timing function 164, a first packet dissembler 168, and a second packet dissembler 170. First direction 85 of call 32, converted by A/D converter 160, is received by channelizer 164 for subdividing frequency bandwidth 58 (FIG. 3) into frequency channels 60 (FIG. 3) to obtain ones of frequency channels 60 (FIG. 3) allocated to uplink channel 40 of circuit switched communication link 36 by capacity allocation function 44.

The ones of frequency channels 60 obtained through channelizer 164 are subdivided into time slots 64 (FIG. 3) in accordance with timing function 166 to detect ones of time slots 64 assigned to uplink channel 40 by capacity allocation function 44.

First direction 85 of call 32 then passes to a carrier sync element 172 and on to a bit timing function 174 for synchronization of call 32 to a reference TDMA frame. Following carrier synchronization at element 172 and bit timing at function 174, first direction 85 of call 32 is concurrently examined by a first correlator 176 of first packet dissembler 168 and a second correlator 178 of second packet dissembler 170.

First correlator 176 examines the overhead information in each received one of first and second packets 111 and 140 to identify first unique identifier 108. When first unique identifier 108 is found in overhead 104 of received ones of first packets 111, first correlator 176 activates a first switch element 180 to allow passage of the identified ones of first packets 111 to an input of a first decoder 182. First decoder 182 decodes first packets 111 in accordance with the encoding protocol performed by voice encoder 98 (FIG. 5) of first packet assembler 90 (FIG. 5) to recover voice signal 84.

Second correlator 178 of second packet dissembler 170 examines the overhead information in each received one of first and second packets 110 and 140 to identify second unique identifier 132. When second unique identifier 132 is found in overhead 128 of received ones of second packets 140, second correlator 178 activates a second switch element 184 to allow passage of the identified ones of second packets 140 to an input of a second decoder 186. Second decoder 186 decodes second packets 140 in accordance with the encoding protocol performed by data encoder 120 (FIG. 5) of second packet assembler 92 (FIG. 5) to recover data signal 86.

Figure 7:
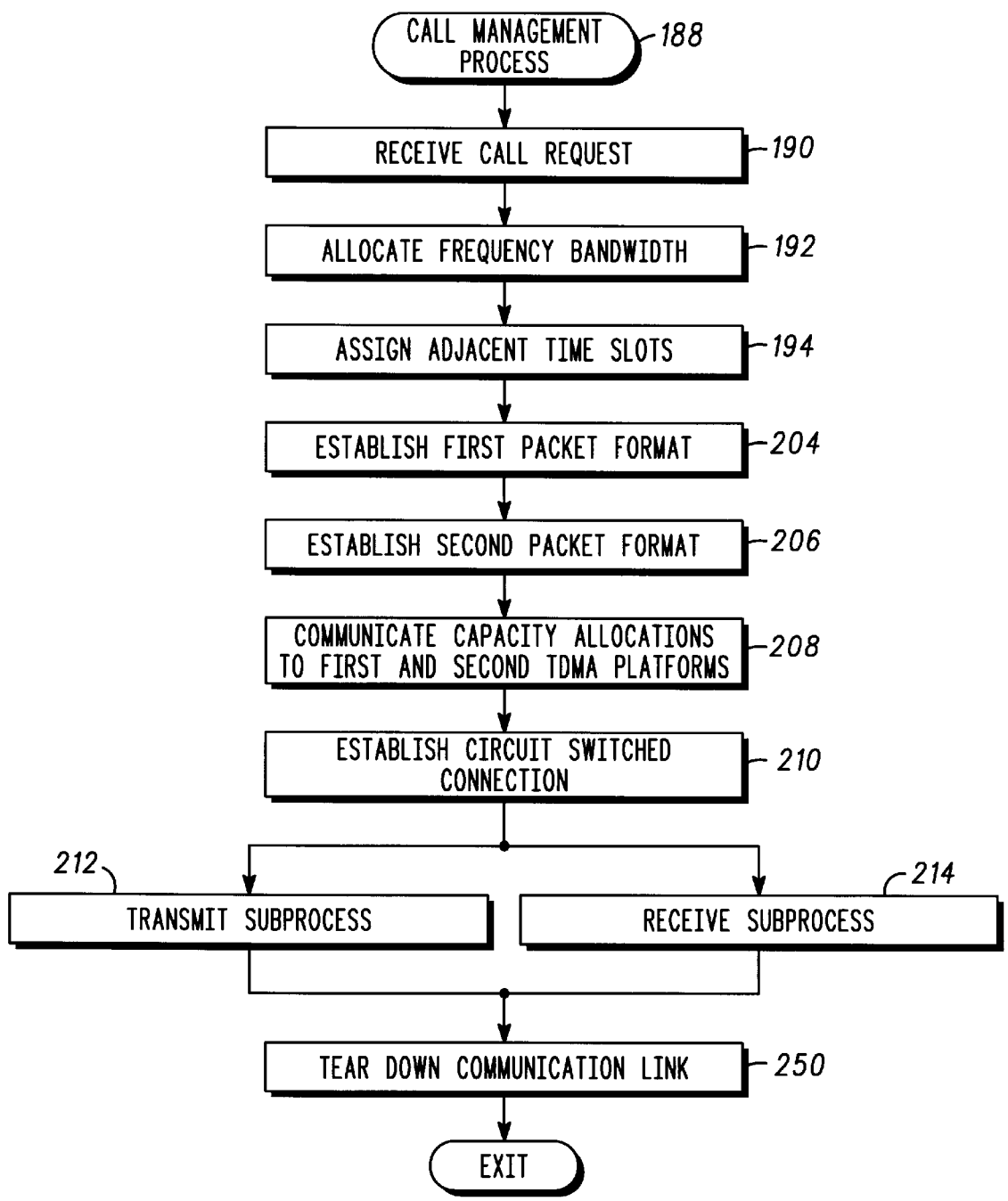
FIG. 7 shows a flow chart of a call management process performed by the TDMA communications system.

FIG. 7 shows a flow chart of a call management process 188 performed by TDMA communications system 20. Process 188 is performed by TDMA communications system 20 to effectively manage calls exhibiting more than one signal type, such as call 32 exhibiting voice signal 84 (FIG. 5) and data signal (FIG. 5).

Call management process 188 is performed to manage the communication of call 32 between first and second TDMA platforms 22 and 24, respectively. Thus, additional call management techniques are employed for routing call 32 from second TDMA platform 24 (FIG. 2) to gateway 26 (FIG. 1) and eventual receipt at communication device 34 (FIG. 1) that are outside of the scope of process 188 and will not be described herein.

For clarity of illustration, first TDMA platform 22 originates call 32 to communication device 34. In addition, the functional elements of TDMA communications system 20 and call management process 188 will be described when first TDMA platform 22 is transmitting first direction 85 (FIG. 4) of call 32 and second TDMA platform 24 is receiving first direction 85 of call 32.

However, it should be readily apparent to those skilled in the art that call 32 is two-way. That is, second TDMA platform 24 may be transmitting while first TDMA platform 22 is receiving. Accordingly, the functional elements and operation of first TDMA platform 22 and second TDMA platform 24 are duplicated so as to accommodate transmissions from second TDMA platform 24 for reception at first TDMA platform 22.

Process 188 begins with a task 190. Task 190 causes second TDMA platform 24 to receive a call request, indicated by dashed arrow 48 (FIG. 2), from first TDMA platform 22 over one of acquisition channels 38. Call request 48 indicates that first TDMA platform 22 desires a communication link with second TDMA platform 24 in order to place a call to communication device 34 (FIG. 1). In addition, call request 48 indicates a data type and/or desired data rate for call 32. In response to task 190, tasks 192 and 194 are performed.

Task 192 causes capacity allocation function 44 (FIG. 2) of communications satellite 26 to allocate frequency bandwidth, i.e., frequency channels 60 (FIG. 3), to first TDMA platform 22 for circuit switched communication link 36.

In conjunction with task 192, task 194 causes capacity allocation function 44 to assign adjacent time slots 64 (FIG. 3) in the frequency channels 60 allocated to first TDMA platform 22 for circuit switched communication link 36.

Figure 8:
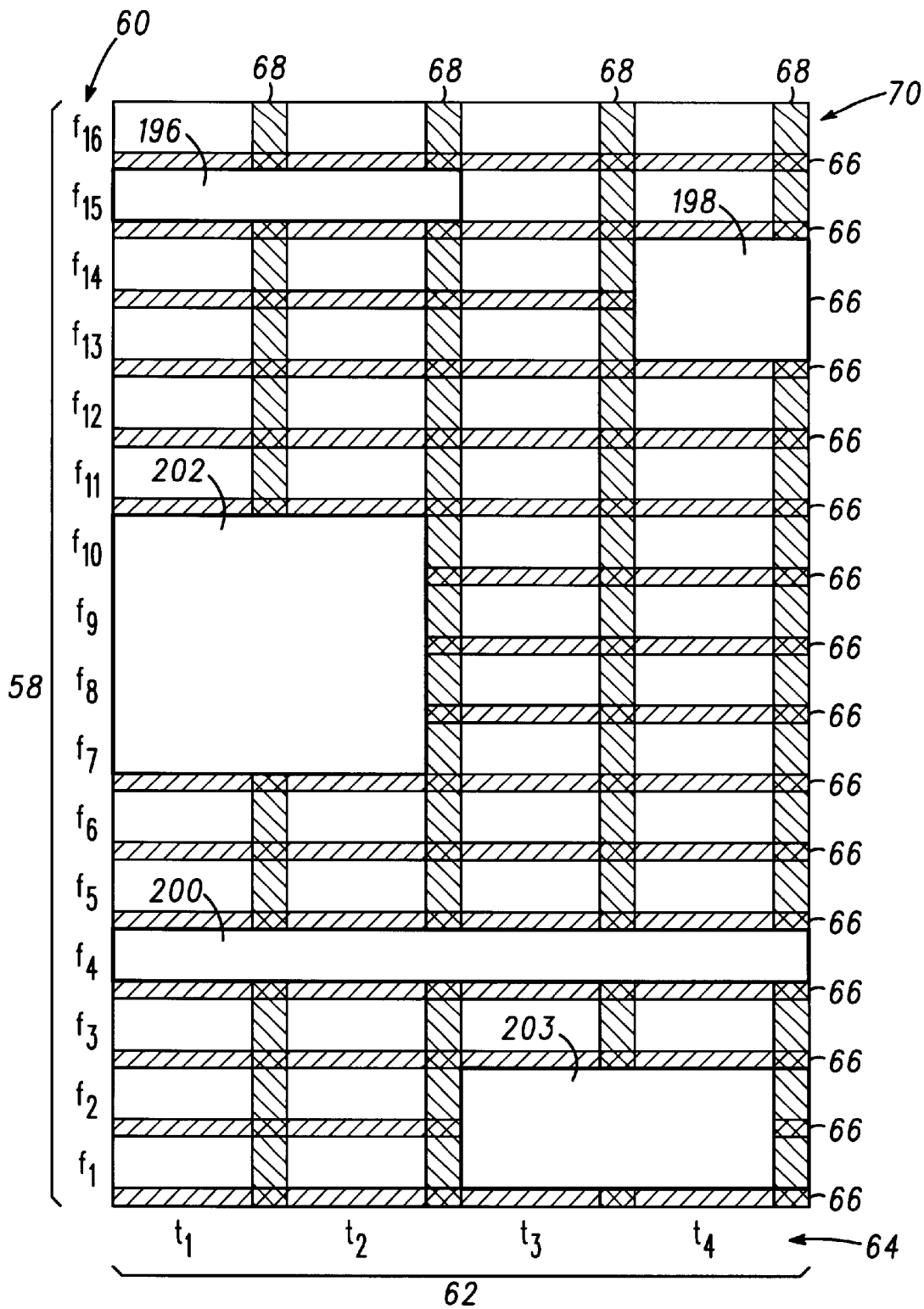
FIG. 8 shows the diagram of the capacity allocation map including capacity allocations for calls in the TDMA communications system.

FIG. 8 shows capacity allocation map 56 including exemplary capacity allocations for calls in TDMA communications system 20. Capacity allocation function 44 (FIG. 2) allocates one or more frequency channels 60 and one or more adjacent time slots 64 of radio spectrum 70 to TDMA platforms conducting calls.

For example, a first exemplary capacity allocation 196 includes frequency channel 60, identified as $f_{15}$, and adjacent time slots 64, identified as $t_1$ and $t_2$. A second exemplary capacity allocation 198 includes an adjacent pair of frequency channels 60, identified as $f_{14}$ and $f_{13}$, and adjacent time slots 64, aligned with each other and each identified as $t_4$. A third exemplary capacity allocation 200 includes frequency channel 60, identified as $f_{14}$, and all of adjacent time slots 64, identified as $t_1$, $t_2$, $t_3$, and $t_4$, in TDMA frame 62. A fourth exemplary capacity allocation 202 includes frequency channels 60, identified as $f_{10}$, $f_9$, $f_8$, and $f_7$, and adjacent time slots 64, identified as $t_1$, and $t_2$.

Referring back to process 188 (FIG. 6), tasks 192 and 194 cause capacity allocation function 44 to allocate capacity to communication link 36 to effectively accommodate the data rate of voice signal 84. For clarity of understanding, tasks 192 and 194 result in capacity allocation function 44 allocating third exemplary capacity allocation 200 to first TDMA platform 22 to form uplink channel 40 of circuit switched communication link 36. In addition, a fifth exemplary capacity allocation 203 is allocated to second TDMA platform 24 to form downlink channel 41 (FIG. 1) of communication link 36.

Following tasks 192 and 194, a task 204 is performed. At task 204, first packet format 113 is established for first packets 111 (FIG. 5). In the preferred embodiment, first packet format 113 results in first packets 111 having a packet size, i.e. duration, equivalent to one of time slots 64. Each of first packets 111 include approximately twenty-five percent overhead 104 with the remaining part of first packets being first signal units 110 of voice signal 84.

Next a task 206 is performed. At task 206, second packet format 142 is established for second packets 140 (FIG. 5). In the preferred embodiment, second packet format 142 results in second packets 140 having a packet size substantially equivalent to third exemplary capacity allocation 200.

Accordingly, second packet format 142 includes frequency channels 60, time slots 64, any inside frequency guard bands 66 (FIG. 8), and any inside time guard bands 68. As such, second packet format 142 results in second packets 140 that are desirably larger than first packets 111 in first packet format 113, although the amount of overhead 128 of second packets 140 remains unchanged from overhead 104 of first packets 111. An advantage of second packet format 142 is that much less of second packets 140 is devoted to overhead 128 relative to the amount of overhead 104 in first packets 111. In addition, in the case of third exemplary capacity allocation 200, time guard bands 68 in $f_4$ frequency channel 60 need not be left vacant. Rather, those time guard bands 68 may be used for the transmission of data signal 86 (FIG. 4). Thus, the capacity, or information carrying ability of the capacity allocation for a communication link increases in second packet format 142 relative to first packet format 111, so as to better accommodate the high bit rate of data signal 86.

Following task 206, a task 208 is performed. Task 208 causes controller 42 (FIG. 2) to communicate third exemplary capacity allocation 200 forming uplink channel 40, determined in tasks 192 and 194 to first TDMA platform 22 over acquisition channels 38. Likewise, fifth exemplary capacity allocation 203 forming downlink channel 41 is communicated to first TDMA platform 22 over acquisition channels 38. In addition, controller 42 communicates third and fifth capacity allocations 200 and 203, respectively, to router 74 (FIG. 2) of second TDMA platform 24.

Following task 208, a task 210 results in the establishment of circuit switched communication link 36 (FIG. 1). That is, second TDMA platform 24, directs antenna element 79 (FIG. 4) and transceiver 80 (FIG. 4) of first TDMA platform 22 to tune to uplink channel 40 and downlink channel 41 of communication link 36. Similarly, second TDMA platform 24 directs antenna element 46 (FIG. 2) and transceiver 47 (FIG. 2) to tune to uplink channel 40 and downlink channel 41 of communication link 36.

Following the establishment of circuit switched communication link 36 between first and second TDMA platforms 22 and 24, respectively, in task 210, a transmit subprocess 212 and a receive subprocess 214 are concurrently performed. In other words, first TDMA platform 22 performs transmit subprocess 212 in order to transmit first direction 85 (FIG. 4) of call 32 over uplink channel 40 of communication link 36 while second TDMA platform performs receive subprocess 214 in order to receive first direction 85 of call 32 over uplink channel 40 of communication link 36.

Figure 9:
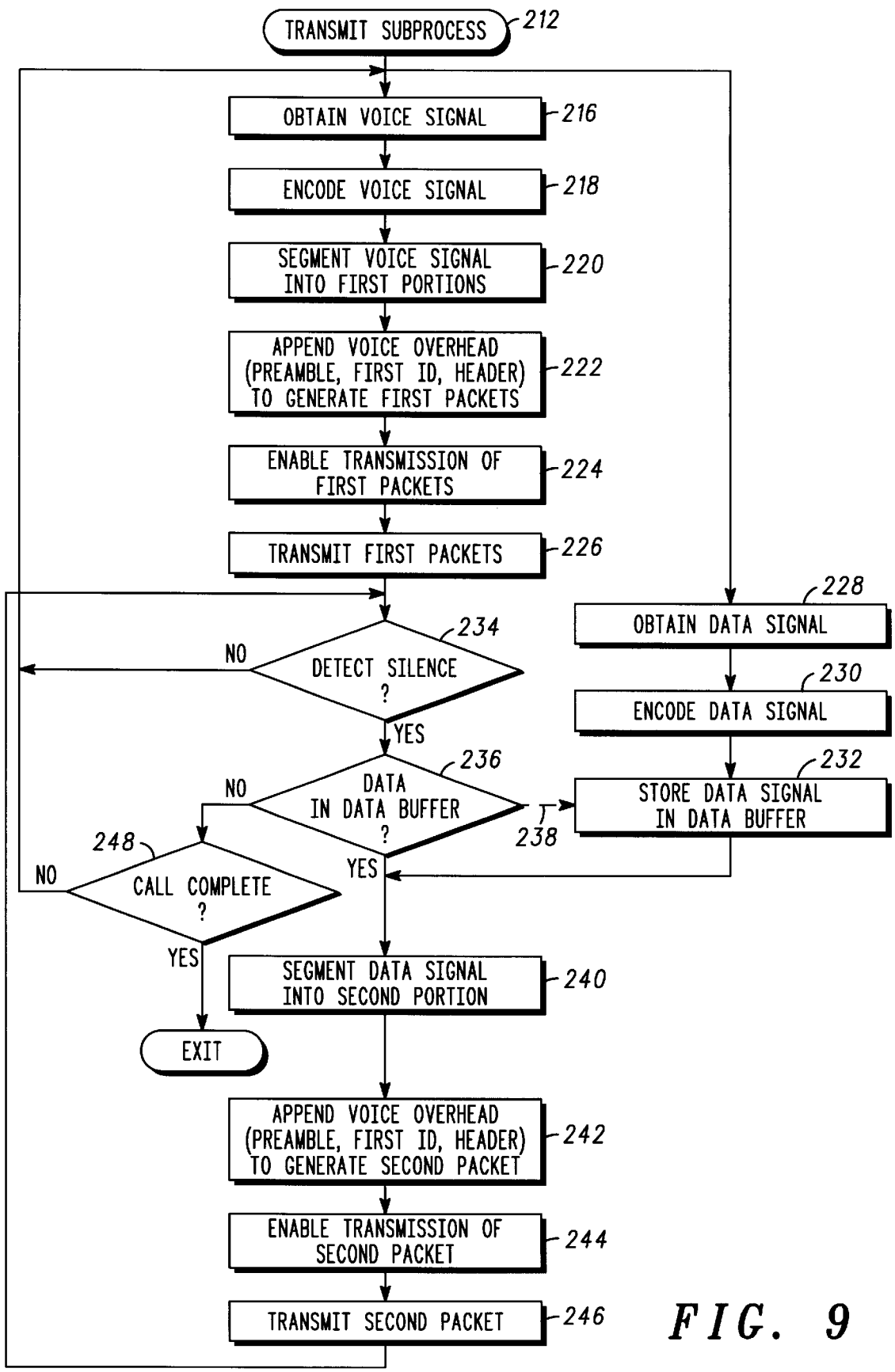
FIG. 9 shows a flow chart of a transmit subprocess of the call management process.

FIG. 9 shows a flow chart of transmit subprocess 212 of the call management process 188. Transmit subprocess 212 is performed by transmission section 83 (FIG. 5) of modem 81 (FIG. 4) in first TDMA platform 22 (FIG. 4) to transmit first packets 111 of voice signal 84 interspersed with second packets 140 of data signal 86.

Referring to transmission section 83 (FIG. 5) in connection with subprocess 212, transmit subprocess 212 begins with a task 216. Task 216 causes transmission section 83 to obtain voice signal 84 at first input 96. Upon receipt of voice signal 84 in task 216, transmit subprocess 212 proceeds to a task 218.

Task 218 causes voice encoder 98 of first packet assembler 90 to encode voice signal 84 and subsequently load encoded voice signal 84 into voice buffer 100.

In response to task 218, a task 220 and a task 222 are performed by first multiplexer 102 of first packet assembler. Task 220 causes first multiplexer 102 to segment voice signal 84 into first signal units 110. In addition, task 222 causes first multiplexer 102 to append overhead 104, including first unique identifier 108, to each of first signal units 110 to generate first packets 111. First packets 111 are output by first multiplexer 102, converted by D/A converter 112, and modulated by first modulator 114 before becoming available at first switch input 116 of switch element 94.

In response to task 222, a task 224 is performed. Task 224 causes controller 88 to enable the passage of first packets 111 from first switch input 116 to switch output 150 for subsequent processing at RF section 152 and output at output 154.

In response to task 224, a task 226 is performed. In task 226, first TDMA platform 22 transmits first packets 111 from antenna element 79 (FIG. 4) of first TDMA platform 22 over uplink channel 40 of circuit switched communication link 36.

With continued reference to FIGS. 5 and 9, subprocess 212 further includes tasks 228, 230, and 232 which are performed by second packet assembler 92 concurrent with the performance of tasks 216, 218, 220, 222, 224, and 226.

Task 228 causes transmission section 83 to obtain data signal 86 at second input 118. Task 228 occurs when a user of first TDMA platform 22 wishes to transmit data signal 86, such as a page message or a data file, to a user of communication device 34 over circuit switched communication link 36 (FIG. 1).

In response to receipt of data signal 86 in task 228, task 230 is performed. Task 230 causes data encoder 120 of second packet assembler 92 to encode data signal 86.

Following encoding at task 230, task 232 is performed by second packet assembler 92. Task 230 causes second packet assembler 92 to store encoded data signal 86 into data buffer 122. Data signal 86 remains in data buffer 122 until the detection of silence in voice signal 84.

Referring back to voice signal transmission task 226 of transmit subprocess 212, following task 226, a query task 234 is performed. Query task 234 is performed by channel activity detector 136 to detect silence in voice signal 84. That is, channel activity detector 136 determines if an amplitude of voice signal 84 at first input 96 falls below predetermined threshold 138 and stays below amplitude threshold 138 for a predetermined period of time.

When the amplitude of voice signal 84 is not less than amplitude threshold 138 in query task 234, program control loops back to task 216, to continue obtaining voice signal 84, generating first packets 111, and transmitting first packets 111 of call 32 over communication link 36. Thus, first TDMA platform 22 prioritizes the transmission of voice signal 84 over the transmission of data signal 86. This priority is desirable so that there is no significant perceptible delay in the transmission of voice signal 84.

However, when query task 234 determines that silence is detected, that is, when channel activity detector 136 determines that the amplitude of voice signal 84 has fallen below amplitude threshold 138, transmit subprocess 212 proceeds to a query task 236.

Query task 236 causes controller 88 to poll data buffer 122, as indicated by a dashed line 238, to determine if data signal 86 is currently being stored in data buffer 122. When query task 236 determines that data buffer 122 is occupied with data signal 86, transmit subprocess 212 proceeds to a task 240.

Task 240 causes second multiplexer 124 of second packet assembler 92 to access data buffer 122 and segment data signal 86 into a second signal units 139. In addition, a task 242 causes second multiplexer 124 to append overhead 128, including second unique identifier 132, to second portion 139 of data signal 86 to generate second packet 140. Second packet 140 is output by second multiplexer 124, converted by D/A converter 144, and modulated by second modulator 146 before becoming available at second switch input 148 of switch element 94.

Following tasks 240 and 242, a task 244 is performed. Task 244 causes controller 88 to enable the passage of second packet 140 from second switch input 148 to switch output 150 for subsequent processing at RF section 152.

In response to task 244, a task 246 is performed. In task 246, first TDMA platform 22 transmits second packet 140 from antenna element 79 (FIG. 4) over uplink channel 40 of circuit switched communication link 36.

Following transmission of second packet 140 in task 266, program control loops back to query task 234, to continue monitoring for voice signal 84 at first input 96. Accordingly, when silence is no longer detected at query task 234, first TDMA platform 22 will discontinue the transmission of second packets 140 and resume transmission of first packets 111 of voice signal 84 at task 216.

However, when silence continues to be detected at query task 234, subprocess 212 proceeds to query task 236 to determine if data buffer 122 is still occupied with data signal 86. While data signal 86 remains in data buffer 122, first TDMA platform 22 will transmit another of second packets 140.

However, when silence is detected at query task 234 and when query task 236 determines that data buffer 122 is not occupied with data signal 86, transmit subprocess 212 proceeds to a query task 248.

Query task 248 causes controller 88 to determine if call 32 is complete. Controller 88 may determine call completion through a call hand-off procedure or through conventional call release signaling. When query task 248 determines that call 32 is not complete, transmit subprocess 212 loops back to task 216 to monitor for and to obtain voice signal 84. Thus, circuit switched communication link 36 remains assigned for exclusive use between first and second TDMA platforms 22 and 24 while silence is detected, i.e., during voice pauses.

However, when query task 248 determines that call 32 is complete, transmit subprocess 212 exits. Referring back to call management process 188 (FIG. 7), after transmit subprocess exits a task 250 is performed (discussed below).

Figure 10:
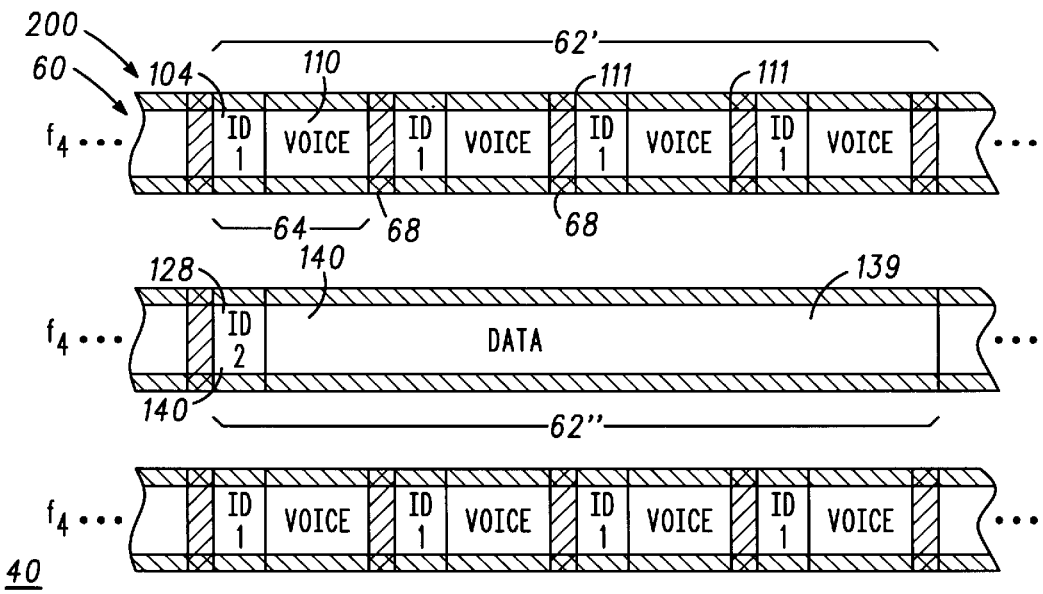
FIG. 10 shows a timing diagram of an up link channel in which a voice signal is interspersed with a data signal.

FIG. 10 shows a timing diagram of uplink channel 40 in which voice signal 84 is interspersed with a data signal 86. In particular, third exemplary capacity allocation 200 is shown having a frequency channel 60, $f_4$, and four adjacent time slots 64 established for first uplink channel 34 of first communication link 30.

During a first TDMA frame 62', time slots 64, separated by vacant time guard bands 68, are occupied with first packets 111 of voice signal 84 generated by first packet assembler 90 (FIG. 5). Overhead 104 is included in each of first packets 111. Therefore, in first TDMA frame 62', having four of time slots 64, overhead 104 is repeated four times.

However, a subsequent second TDMA frame 62" is occupied with second packet 140 generated by second packet assembler 92 (FIG. 5). Since second packet 140 is equivalent in size to TDMA frame 62", overhead 128 is only transmitted once during second TDMA frame 62". In addition, time guard bands 68 which were vacant during TDMA frame 62' are now occupied with second signal units 139 of data signal 86.

Figure 11:
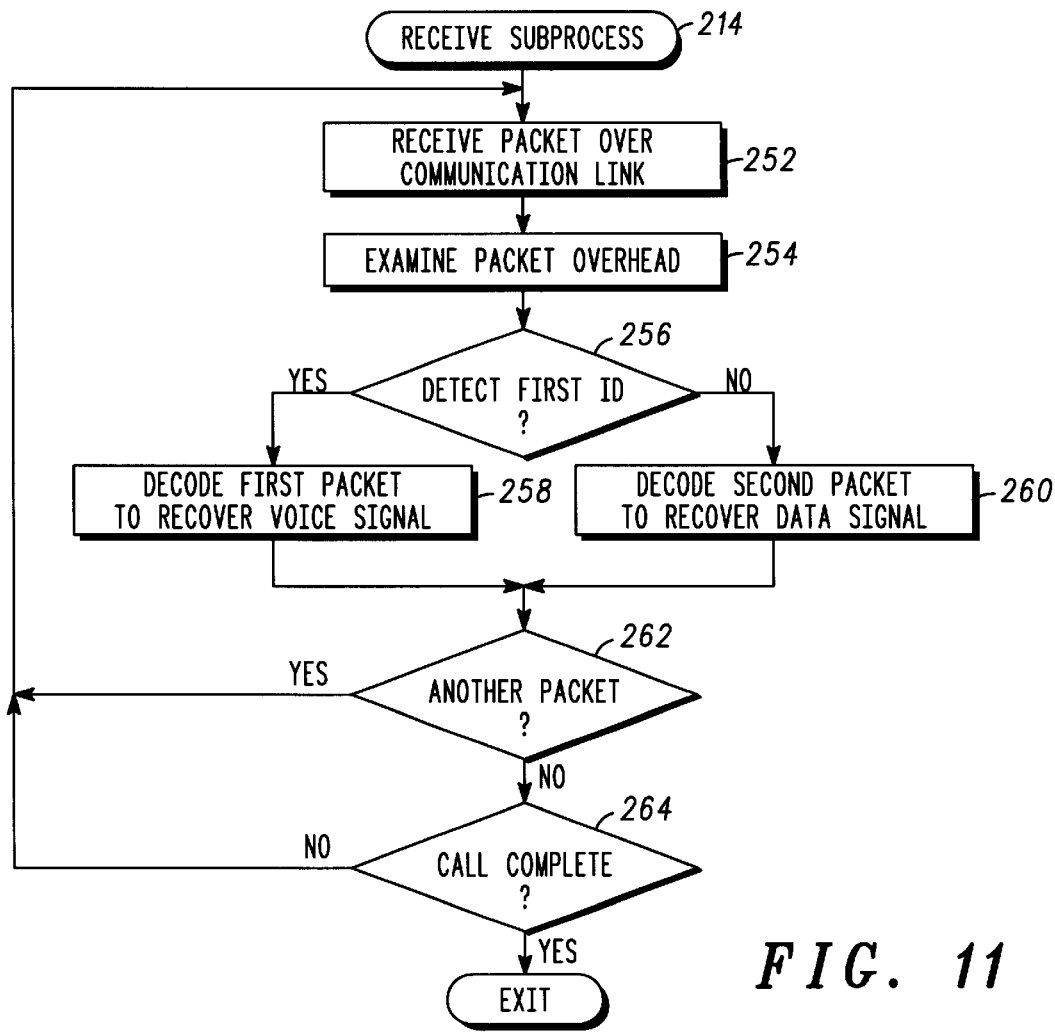
FIG. 11 shows a flow chart of a receive subprocess of the call management process.

FIG. 11 shows a flow chart of receive subprocess 214 of call management process 188 (FIG. 7). Receive subprocess 214 is performed by receiving section 156 (FIG. 6) of one of modems 72 (FIG. 2) in second TDMA platform 24 (FIG. 2) to receive first packets 111 of voice signal 84 and second packets 140 of data signal 86 transmitted from first TDMA platform 22 during transmit subprocess 212 (FIG. 9).

Receive subprocess 214 begins with a task 252. Referring to FIG. 6 in connection with receive subprocess 214, task 252 causes second TDMA platform 24 to receive one of first and second packets 111 and 140, respectively, over uplink 40 of circuit switched communication link 36. Accordingly, receiving task 252 occurs by the reception of first direction 85 (FIG. 4) of call 32 (FIG. 1) and the subsequent conversion of first direction 85 of call 32 through A/D converter 160, channelization through channelizer 164, identification of time slots 64 in response to third exemplary capacity allocation 200, synchronization through carrier sync 172, and timing through bit timing element 174 in order to isolate one of first and second packets 111 and 140.

Following receiving task 252, a task 254 is performed. At task 254 each of first correlator 176 and second correlator 178 examine the overhead of the received one of first and second packets 111 and 140. First correlator 176 examines the overhead to look for first unique identifier 108 (FIG. 5), and second correlator 178 examines the overhead to look for second unique identifier 132 (FIG. 5).

Following task 254, a query task 256 is performed. Query task 256 determines whether first unique identifier 108 is detected by first correlator 176, indicating the received packet is first packet 111. When first unique identifier 108 is detected at query task 256, a task 258 is performed.

Task 258 causes first correlator 176 to activate first switch element 180 to allow passage of the identified one of first packets 111 to first decoder 182. First packet 111 is subsequently decoded by first decoder 182 of first packet dissembler 168 to recover voice signal 84 at second TDMA platform 24.

When query task 256 determines that first unique identifier 108 is not detected by first correlator 176 receive subprocess 214 proceeds to a task 260. First unique identifier 108 and second unique identifier 132 are mutually exclusive. That is, if first unique identifier 108 is not detected by first correlator 176, than second unique identifier 132 was detected by second correlator 178, indicating second packet 140.

Accordingly, task 260 causes second correlator 178 to activate second switch element 184 to allow passage of the identified one of second packets 140 to second decoder 186. Second packet 140 is subsequently decoded by second decoder 186 of second packet dissembler 170 to recover data signal 86 at second TDMA platform 24.

Following either of decoding tasks 258 and 260, a query task 262 is performed. Query task 262 determines whether there is another one of first and second packets 111 and 140. When query task 262 determines that there is another one of first and second packets 111 and 140, transmit subprocess 214 loops back to task 252 to receive another one of first and second packets 111 and 140 for subsequent decoding and recovery of one of voice signal 84 and data signal 86.

When query task 262 determines that there is not another one of first and second packets 111 and 140, receive subprocess 214 proceeds to a query task 264. Query task 264 causes controller 162 to determine if call 32 is complete. Controller 162 may determine call completion through a call hand-off procedure or through conventional call release signaling.

When query task 264 determines that call 32 is not complete, receive subprocess 214 loops back to task 252 to monitor for and to receive another one of first and second packets 111 and 140. Call 32 may not be complete, even though first TDMA platform 22 (FIG. 4) is not currently performing transmit subprocess 212 (FIG. 6) because second TDMA platform 24 may now be transmitting. When query task 264 determines that call 32 is complete, receive subprocess 214 exits.

Referring back to call management process 188 (FIG. 7) following concurrent subprocesses 212 and 214, process 188 proceeds to task 250. Task 250 causes second TDMA platform 24 (FIG. 2) to tear down circuit switched communication link 36. Through the detection of call release signaling either from first TDMA platform 22 or second TDMA platform 24, communication link 36 is released. Once released, those portions of radio spectrum 70 (FIG. 3) used to establish communication link 36 are now available for assignment to another call. Following task 250, call management process 188 exits.

In summary, the present invention teaches of a TDMA communications system and a call management method that manage calls exhibiting two differing signal types, such as real time signals and data signals. The system and method generate packets in a first packet format for real time signals and in a second packet format for data signals. The second packet format increases the information carrying ability of an initially requested circuit switched connection to better accommodate the high rate data signals. In addition, the two differing packet types are transmitted and received over an initially requested circuit switched connection to dynamically accommodate transmission and receipt of both real time and data signals without the need for employing a reallocation activity.

Although the preferred embodiments of the invention have been illustrated and described in detail, it will be readily apparent to those skilled in the art that various modifications may be made therein without departing from the spirit of the invention or from the scope of the appended claims. For example, the functional elements that accomplish packetization of the first and second data types may differ. Likewise, the order of tasks in each of the processes and subprocesses may differ significantly.

What is claimed is:

1. A time division multiple access (TDMA) communications system comprising:
   a first TDMA platform for transmitting a call over a communication link, said call exhibiting a first signal type and a second signal type;
   a second TDMA platform for receiving said call over said communication link;
   means, in communication with said first TDMA platform and said second TDMA platform, for establishing a capacity allocation for said communication link in response to said first signal type, wherein said first TDMA platform transmits said call over said communication link in a first packet format using said capacity allocation when said call exhibits said first signal type, and said first TDMA platform transmits said call over said communication link in a second packet format using said capacity allocation when said call exhibits said second signal type;
   wherein a frequency bandwidth and adjacent time slots of a TDMA frame in said frequency bandwidth form said capacity allocation, said first signal type is a real time signal, said second signal type is a data signal, and said first TDMA platform comprises:
   a controller;
   a first input for receiving said real time signal;
   a first multiplexer in communication with said first input and responsive to said controller, said first multiplexer segmenting said real time signal into first signal units and appending a first unique identifier to each of said first signal units to generate first packets of said call in said first packet format, each of said first packets having a first packet size substantially equivalent to one of said adjacent time slots;
   a second input for receiving said data signal;
   a second multiplexer in communication with said second input and responsive to said controller, said second multiplexer segmenting said data signal into second signal units and appending a second unique identifier to each of said second signal units to generate second packets of said call in said second packet format, each of said second packets having a second packet size substantially equivalent to said capacity allocation; and
   a signal output, in communication with a first output of said first multiplexer and a second output of said second multiplexer, for providing said first packets and said second packets of said call to said communication link.

2. A TDMA communications system as claimed in claim 1 wherein said first signal type is a real time signal, and said establishing means assigns frequency bandwidth and allocates adjacent time slots in a TDMA frame of said frequency bandwidth to form said communication link for substantially exclusive use for said call.

3. A TDMA communications system as claimed in claim 1 wherein said second packet size is substantially equivalent to said TDMA frame.

4. A TDMA communications system as claimed in claim 1 wherein said first TDMA platform further comprises:
   a channel activity detector in communication with said first input and said controller for detecting silence in said real time signal; and
   a switch element responsive to said controller and having a first input in communication with said first output of said first multiplexer, a second input in communication with said second output of said second multiplexer, and a switch output coupled to said signal output, said controller causing said switch element to enable transmission of said second packets over said communication link upon detection of said silence.

5. A TDMA communications system as claimed in claim 4 wherein said controller prevents said switch element from enabling transmission of said second packets over said communication link while said first packets are being transmitted over said communication link.

6. A TDMA communications system as claimed in claim 1 wherein:
   said first TDMA platform further comprises:
   a first encoder coupled between said first input and said first multiplexer for encoding said real time signal in accordance with a first encoding protocol; and
   a second encoder coupled between said second input and said second multiplexer for encoding said data signal in accordance with a second encoding protocol; and said second TDMA platform comprises:
  a receiver input for receiving said first packets and said second packets of said call over said communication link;
  a first correlator in communication with said receiver input for detecting said first unique identifier in received ones of said first packets;
  a first decoder responsive to said first correlator for decoding said received ones of said first packets in accordance with said first encoding protocol to recover said real time signal;
  a second correlator in communication with said receiver input for detecting said second unique identifier in received ones of said second packets; and
  a second decoder responsive to said second correlator for decoding said received ones of said second packets in accordance with said second encoding protocol to recover said data signal.

7. In a time division multiple access (TDMA) communications system, a method of managing a call exhibiting a first signal type and a second signal type comprising:
  a) establishing a communication link for said call, said communication link being characterized by a capacity allocation responsive to said first signal type;
  b) when said call exhibits said first signal type, transmitting first packets of said call over said communication link in a first packet format using said capacity allocation;
  c) when said call exhibits said second signal type, transmitting second packets of said call over said communication link in a second packet format using said capacity allocation;
    wherein said first signal type is a voice signal, said second signal type is a data signal, and said method further comprises the steps of:
  detecting silence in said voice signal when transmitting said first packets of said call over said communication link; and
  enabling transmission of said second packets of said call over said communication link during said silence; and
  d) wherein said activity a) includes
    receiving a request for said call indicating said real time signal;
    assigning frequency bandwidth to said call in response to said request;
    allocating adjacent time slots of a TDMA frame in said frequency bandwidth to said call in response to said request, said frequency bandwidth and said adjacent time slots forming said capacity allocation.

8. A method as claimed in claim 7 wherein said first signal type is a real time signal, said second signal type is a data signal, and said activity a)further comprises:
  determining a first packet size in said first packet format as being substantially equivalent to one of said adjacent time slots; and
  determining a second packet size in said second packet format as being substantially equivalent to said capacity allocation.

9. A method as claimed in claim 8 wherein:
  said frequency bandwidth includes frequency channels and at least one frequency guard band separating said frequency channels; and
  said capacity allocation includes said frequency channels and said at least one frequency guard band.

10. A method as claimed in claim 8 wherein:
  said adjacent time slots includes at least one time guard band separating said adjacent time slots; and
  said capacity allocation includes said adjacent time slots and said at least one time guard band.

11. A method as claimed in claim 8, wherein:
  said frequency bandwidth includes a frequency channel; and
  said capacity allocation is substantially equivalent to said TDMA frame in said frequency channel.

12. A method as claimed in claim 8, wherein:
  said frequency bandwidth includes frequency channels separated by at least one frequency guard band;
  each of said frequency channels includes said adjacent time slots separated by at least one time guard band; and
  said capacity allocation is substantially equivalent to said frequency channels, said at least one frequency guard band, said adjacent time slots for each of said frequency channels, and said at least one time guard band.

13. A method as claimed in claim 7 further comprising delaying said activity c) when said activity b) occurs.

14. A method as claimed in claim 7 wherein consecutive TDMA frames of a frequency channel are divided into a sequence of time slots, said first signal type is a real time signal, said second signal type is a data signal, and said method further comprises:
  segmenting said real time signal into first signal units prior to said activity b);
  appending a first unique identifier to each of said first signal units of said real time signal prior to said activity b) to generate said first packets of said call in said first packet format, each of said first packets having a first packet size substantially equivalent to one of said time slots;
  segmenting said data signal into second signal units prior to said activity c); and
  appending a second unique identifier to each of said second signal units of said data signal prior to said activity c) to generate said second packets of said call in said second packet format, each of said second packets having a second packet size substantially equivalent to said capacity allocation.

15. A method as claimed in claim 14 further comprising:
  encoding said real time signal in accordance with a first encoding protocol prior to said activity b);
  encoding said data signal in accordance with a second encoding protocol prior to said activity c);
  receiving said first packets and said second packets of said call over said communication link;
  detecting one of said first unique identifier and said second unique identifier in received ones of said first packets and said second packets of said call;
  when said first unique identifier is detected, decoding said received ones of said first packets in accordance with said first encoding protocol to recover said real time signal; and
  when said second unique identifier is detected, decoding said received ones of said second packets in accordance with said second encoding protocol to recover said data signal.

16. A time division multiple access (TDMA) communications system comprising:
  a first TDMA platform for transmitting a call over a communication link, said call exhibiting a real time signal and a data signal, and said first TDMA platform including:

a controller;

a first input configured to receive said real time signal;

a first multiplexer in communication with said first input and responsive to said controller, said first multiplexer segmenting said real time signal into first signal units and appending a first unique identifier to each of said first signal units to generate first packets of said call;

a second input configured to receive said data signal;

a second multiplexer in communication with said second input and responsive to said controller, said second multiplexer segmenting said data signal into second signal units and appending a second unique identifier to each of said second signal units to generate second packets of said call; and a signal output, in communication with a first output of said first multiplexer and a second output of said second multiplexer, for providing said first packets and said second packets of said call to said communication link;

a second TDMA platform for receiving said first packets and said second packets of said call over said communication link; and means, in communication with said first TDMA platform and said second TDMA platform, for establishing a capacity allocation for said communication link, said establishing means assigning frequency bandwidth and allocating adjacent time slots in a TDMA frame of said frequency bandwidth for substantially exclusive use for said call in response to said real time signal, said frequency bandwidth and said adjacent time slots forming said capacity allocation, said first packets having a first packet size substantially equivalent to one of said adjacent time slots, said second packets having a second packet size substantially equivalent to said capacity allocation; wherein when said call exhibits said real time signal, said first TDMA platform transmits said first packets of said call over said communication link using said capacity allocation; and when said call exhibits said data signal, said first TDMA platform transmits said second packets of said call over said communication link using said capacity allocation.

17. A TDMA communications system as claimed in claim 16 wherein said first TDMA platform further comprises:

a channel activity detector in communication with said first input and said controller for detecting silence in said real time signal; and a switch element responsive to said controller and having a first input in communication with said first output of said first multiplexer, a second input in communication with said second output of said second multiplexer, and a switch output coupled to said signal output, said controller causing said switch element to enable transmission of said second packets over said communication link upon detection of said silence, and said controller preventing said switch element from enabling transmission of said second packets over said communication link while said first packets are being transmitted over said communication link.

18. A TDMA communications system as claimed in claim 16 wherein:

said first TDMA platform further comprises:
  a first encoder coupled between said first input and said first multiplexer for encoding said real time signal in accordance with a first encoding protocol; and
  a second encoder coupled between said second input and said second multiplexer for encoding said data signal in accordance with a second encoding protocol; and said second TDMA platform comprises:
  a receiver input for receiving said first packets and said second packets of said call over said communication link;
  a first correlator in communication with said receiver input for detecting said first unique identifier in received ones of said first packets;
  a first decoder decoding said received ones of said first packets in accordance with said first encoding protocol to recover said real time signal;
  a second correlator in communication with said receiver input for detecting said second unique identifier in received ones of said second packets; and
  a second decoder responsive to said second correlator for decoding said received ones of said second packets in accordance with said second encoding protocol to recover said data signal.

* * * * *